(12) United States Patent
Yang et al.

(10) Patent No.: US 9,467,485 B2
(45) Date of Patent: Oct. 11, 2016

(54) METHOD FOR SWITCHING SESSION OF IMS NETWORK AND EATF

(71) Applicant: ZTE CORPORATION, Shenzhen, Guangdong Province (CN)

(72) Inventors: Qiang Yang, Shenzhen (CN); Chen Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 25 days.

(21) Appl. No.: 14/407,496

(22) PCT Filed: Jun. 24, 2013

(86) PCT No.: PCT/CN2013/077798
§ 371 (c)(1),
(2) Date: Dec. 12, 2014

(87) PCT Pub. No.: WO2014/000615
PCT Pub. Date: Jan. 3, 2014

(65) Prior Publication Data
US 2015/0163255 A1    Jun. 11, 2015

(30) Foreign Application Priority Data

Jun. 26, 2012    (CN) .......................... 2012 1 0213028

(51) Int. Cl.
*H04W 4/16*    (2009.01)
*H04L 29/06*    (2006.01)
(Continued)

(52) U.S. Cl.
CPC ....... *H04L 65/1093* (2013.01); *H04L 65/1016* (2013.01); *H04L 65/1046* (2013.01);
(Continued)

(58) Field of Classification Search
CPC ........... H04L 65/1093; H04L 65/1096; H04L 65/1016; H04L 65/1046; H04L 65/60; H04L 65/1069; H04L 12/5895; H04W 4/15; H04W 4/22; H04W 76/007; H04W 36/14; H04W 36/0033; H04W 36/0027; H04W 80/10

USPC .................... 370/259–331; 455/404.1, 404.2
See application file for complete search history.

(56) References Cited

U.S. PATENT DOCUMENTS

2009/0225725 A1    9/2009  Zhu
2013/0029629 A1*   1/2013  Lindholm ......... H04W 36/0022
                                                           455/404.1

(Continued)

FOREIGN PATENT DOCUMENTS

CN    101227647 A    7/2008
CN    102124713 A    7/2011

(Continued)

OTHER PUBLICATIONS

Technical Specification Group Services and System Aspects; 3rd Generation Partnership Project; IP Multimedia Subsystem (IMS) emergency sessions; (Release 11) ; 3GPP TS 23.167 V11.5.0 (Jun. 2012).

(Continued)

*Primary Examiner* — Afsar M Qureshi
(74) *Attorney, Agent, or Firm* — Ling Wu; Stephen Yang; Ling and Yang Intellectual Property

(57) ABSTRACT

A method for switching a session of an IP Multimedia Subsystem (IMS) network and an Emergency Access Transfer Function (EATF) entity are disclosed. The method includes: the EATF entity anchoring a call sent by a network element in a call initiation domain, and routing the call to an Emergency-Call Session Control Function (E-CSCF); the EATF entity receiving call transfer invite message sent by a network element in a call termination domain; and if identifying that the call transfer invite message is an invite message inviting to perform transfer of the call, the EATF entity performing media negotiation, and sending a response message carrying media information to the network element in the call termination domain.

9 Claims, 3 Drawing Sheets

(51) Int. Cl.
  *H04W 36/14* (2009.01)
  *H04W 76/00* (2009.01)
  *H04W 4/22* (2009.01)
(52) U.S. Cl.
  CPC ........... *H04L65/1069* (2013.01); *H04L 65/60* (2013.01); *H04W 4/16* (2013.01); *H04W 4/22* (2013.01); *H04W 36/14* (2013.01); *H04W 76/007* (2013.01); *H04L 65/1096* (2013.01)

(56) References Cited

U.S. PATENT DOCUMENTS

| | | | | |
|---|---|---|---|---|
| 2013/0188607 | A1* | 7/2013 | Mutikainen | H04W 4/22 370/331 |
| 2013/0195076 | A1* | 8/2013 | Keller | H04W 36/0022 370/331 |
| 2014/0370842 | A1* | 12/2014 | Abtin | H04L 65/1069 455/404.2 |
| 2014/0376514 | A1* | 12/2014 | Wong | H04W 4/22 370/331 |
| 2015/0016420 | A1* | 1/2015 | Balabhadruni | H04W 4/22 370/331 |

FOREIGN PATENT DOCUMENTS

| | | |
|---|---|---|
| CN | 102739669 A | 10/2012 |
| RU | 2008146757 A | 6/2010 |
| WO | WO2010141882 A2 | 12/2010 |
| WO | 2011057865 A2 | 5/2011 |
| WO | 2011123794 A1 | 10/2011 |
| WO | 2012046100 A1 | 4/2012 |

OTHER PUBLICATIONS

Technical Specification Group Services and System Aspects; 3rd Generation Partnership Project; IP Multimedia Subsystem (IMS) Service Continuity; Stage 2; (Release 12); 3GPP TS 23.237 V12.0.0 (Jun. 2012).

* cited by examiner

METHOD FOR SWITCHING SESSION OF IMS NETWORK AND EATF

PRIORITY

The present application claims priority to Chinese Patent Application No. 201210213028.4, filed on Jun. 26, 2012, the disclosure of which is incorporated herein by reference as if set forth fully herein.

TECHNICAL FIELD

The present document relates to the field of communication, and particularly, to a method for switching a session of an Internet Protocol Multimedia Subsystem (IMS) network and an Emergency Access Transfer Function (EATF) entity.

BACKGROUND

The IP Multimedia Core Network Subsystem (IMS) is an IP-based network architecture proposed by the 3rd Generation Partnership Project (3GPP) organization, which constructs an open and flexible service environment, supports multimedia applications, and provides rich multimedia services for users.

At present, the mobile communication is mainly dominated by Circuit Switched (CS) networks, such as the Global System for Mobile Communications (GSM) and the Code Division Multiple Access (CDMA) and so on, and there have been specifications and patents with respect to the User Equipment (UE) accessing the IMS via the CS currently.

In the specifications such as the TS 24.292, the 3GPP TS 23.237 and the 3GPP TS 24.237 etc., there have been signaling and flow descriptions for implementing an emergency call transfer between Packet Switched (PS) and CS by using the EATF entity.

As shown in FIG. 1, it is a flow diagram of signaling of the existing emergency call PS-CS transfer process, and the process includes the following steps.

In step 101, a user initiates an emergency call via the PS access.

In step 102, a Proxy-Call Session Control Function (P-CSCF) routes the emergency call to an Emergency-Call Session Control Function (E-CSCF) according to the existing mechanism.

In step 103, the E-CSCF routes the call to an EATF entity.

In step 104-105, the EATF entity anchors the call, and sends the call to the original E-CSCF.

In step 106-111, the follow-up emergency call flow is completed according to the existing mechanism.

In step 112, the user moves to the CS, initiates an emergency call transfer invite to an IMS network via an enhanced Mobile Switching Center (eMSC) server, and routes the invite to an Inquiry-CSCF (I-CSCF) of a home domain.

In step 113, the I-CSCF routes the transfer invite to the EATF entity according to the existing mechanism.

In step 114, the EATF entity identifies that the received invite (INVITE) message which requests for performing transfer of a certain existing emergency call, and initiates a media negotiation flow to an existing session of the other side.

In step 115-117, the media negotiation is implemented according to the existing mechanism.

In step 118-119, response message is sent to the eMSC server, the acquired far-end media is included in the message, and a media channel between the user (accessing via the CS) and a Public Safety Answering Point (PSAP) is established to implement a continued call.

In step 120-125, the EATF entity initiates to release an original PS access side session.

The follow-up flow is identical with the existing relevant specifications, which will not be described in detail here.

However, the related art has the following problems: the role and functions of the EATF entity are similar to those of a Service Centralization and Continuity Application Server (SCC AS) in the ordinary call transfer, and the problem of long transfer process exposed by the Single Radio Voice Call Continuity (SR VCC) transfer will exist.

SUMMARY

The example of the present document provides a method for switching a session of an IMS network and an EATF, to solve the problem of longer transfer process existing in the existing transfer.

The example of the present document provides a method for switching a session of an IP Multimedia Subsystem (IMS) network, which comprises:

an Emergency Access Transfer Function (EATF) entity anchoring a call sent by a network element in the call initiation domain, and routing the call to an Emergency-Call Session Control Function (E-CSCF);

the EATF entity receiving call transfer invite message sent by a network element in the call termination domain; and if identifying that the call transfer invite message is invite message inviting to perform transfer of the call, the EATF entity performing media negotiation, and sending response message carrying media information to the network element in the call termination domain.

The step of the EATF entity performing media negotiation and sending response message carrying media information to the network element in the call termination domain comprises:

if identifying that the call transfer invite message is the invite message inviting to perform transfer of the call, the EATF entity initiating the media negotiation to the call through a media carried in the call transfer invite message to obtain far-end media information, and sending response message carrying the far-end media information to the network element in the call termination domain.

The method further comprises: the EATF entity anchoring the media after anchoring the call sent by the network element in the call initiation domain.

The step of the EATF entity performing media negotiation and sending response message carrying media information to the network element in the call termination domain comprises:

if identifying that the call transfer invite message is the invite message inviting to perform transfer of the call, the EATF entity replacing a media which a call initiation domain accesses with a media carried in the call transfer invite message, performing media negotiation with an Access Transfer Gateway (ATGW) to obtain ATGW anchored media information, and sending response message carrying the ATGW anchored media information to the network element in the call termination domain.

The network element in the call initiation domain is a Proxy-Call Session Control Function (P-CSCF), and the network element in the call termination domain is a Mobile Switching Center (MSC) server; or the network element in the call initiation domain is the MSC server, and the network element in the call termination domain is the P-CSCF.

The example of the present document further provides an Emergency Access Transfer Function (EATF) entity, which comprises:

an anchoring module, configured to: anchor a call sent by a network element in the call initiation domain, and route the call to an Emergency-Call Session Control Function (E-CSCF);

a receiving module, configured to: receive call transfer invite message sent by a network element in the call termination domain; and a processing module, configured to: if identifying that the call transfer invite message is invite message inviting to perform transfer of the call, perform media negotiation, and send response message carrying media information to the network element in the call termination domain.

The processing module is configured to perform media negotiation and send response message carrying media information to the network element in the call termination domain in the following way:

if identifying that the call transfer invite message is the invite message inviting to perform transfer of the call, initiating the media negotiation to the call through a media carried in the call transfer invite message to obtain far-end media information, and sending response message carrying the far-end media information to the network element in the call termination domain.

The anchoring module is further configured to: anchor the media after anchoring the call sent by the network element in the call initiation domain.

The processing module is configured to perform media negotiation and send response message carrying media information to the network element in the call termination domain in the following way:

if identifying that the call transfer invite message is the invite message inviting to perform transfer of the call, replacing a media which a call initiation domain accesses with a media carried in the call transfer invite message, performing media negotiation with an Access Transfer Gateway (ATGW) to obtain ATGW anchored media information, and sending response message carrying the ATGW anchored media information to the network element in the call termination domain.

The network element in the call initiation domain is a Proxy-Call Session Control Function (P-CSCF), and the network element in the call termination domain is a Mobile Switching Center (MSC) server; or the network element in the call initiation domain is the MSC server, and the network element in the call termination domain is the P-CSCF.

The EATF entity and the P-CSCF are configured in one or configured separately; or the EATF entity and the E-CSCF are configured in one or configured separately.

With the example of the present document, the engineering networking and routing configuration can be simple and convenient, and the transfer speed can be further accelerated, which improves the user experience.

PREFERRED EMBODIMENTS OF THE PRESENT DOCUMENT

The examples of the present document will be described in detail in combination with the accompanying drawings below. It should be noted that the examples in the present application and the examples and the features in the examples can be optionally combined with each other in the condition of no conflict.

In the example of the present document, EATF entity network elements responsible for the emergency call transfer are arranged in a visit domain, and the call transfer can be implemented by using the EATF entity according to the way of anchoring the media.

The example of the present document provides a method for switching a session of an IMS network, and the method includes the following steps.

In step 11, an EATF entity anchors a call sent by a network element in the call initiation domain, and routes the call to an Emergency-Call Session Control Function (E-CSCF).

In step 12, the EATF entity receives call transfer invite message sent by a network element in the call termination domain.

In step 13, if identifying that the call transfer invite message is the invite message inviting to perform transfer of the call, the EATF entity performs media negotiation, and sends a response message carrying media information to the network element in the call termination domain.

Wherein, the network element in the call initiation domain is a Proxy-Call Session Control Function (P-CSCF), and the network element in the call termination domain is a Mobile Switching Center (MSC) server; or, the network element in the call initiation domain is the MSC server, and the network element in the call termination domain is the P-CSCF.

By taking that the network element in the call initiation domain is the Proxy-Call Session Control Function (P-CSCF) and the network element in the call termination domain is the Mobile Switching Center (MSC) server as an example, the technical scheme of the present document will be described in detail below.

Figure 1:
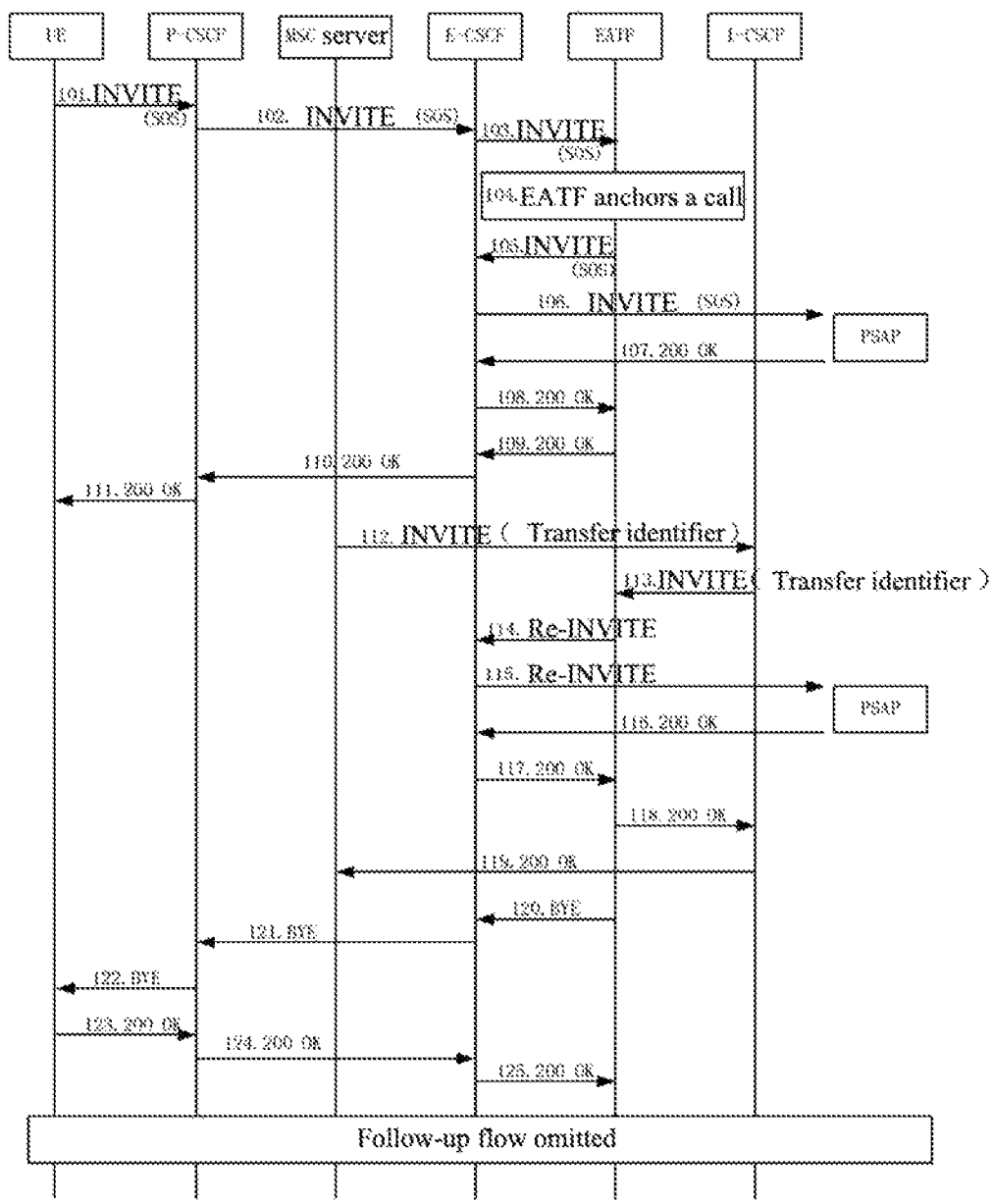
FIG. 1 is a flow diagram of signaling related to the emergency call PS-CS transfer process.
Figure 2:
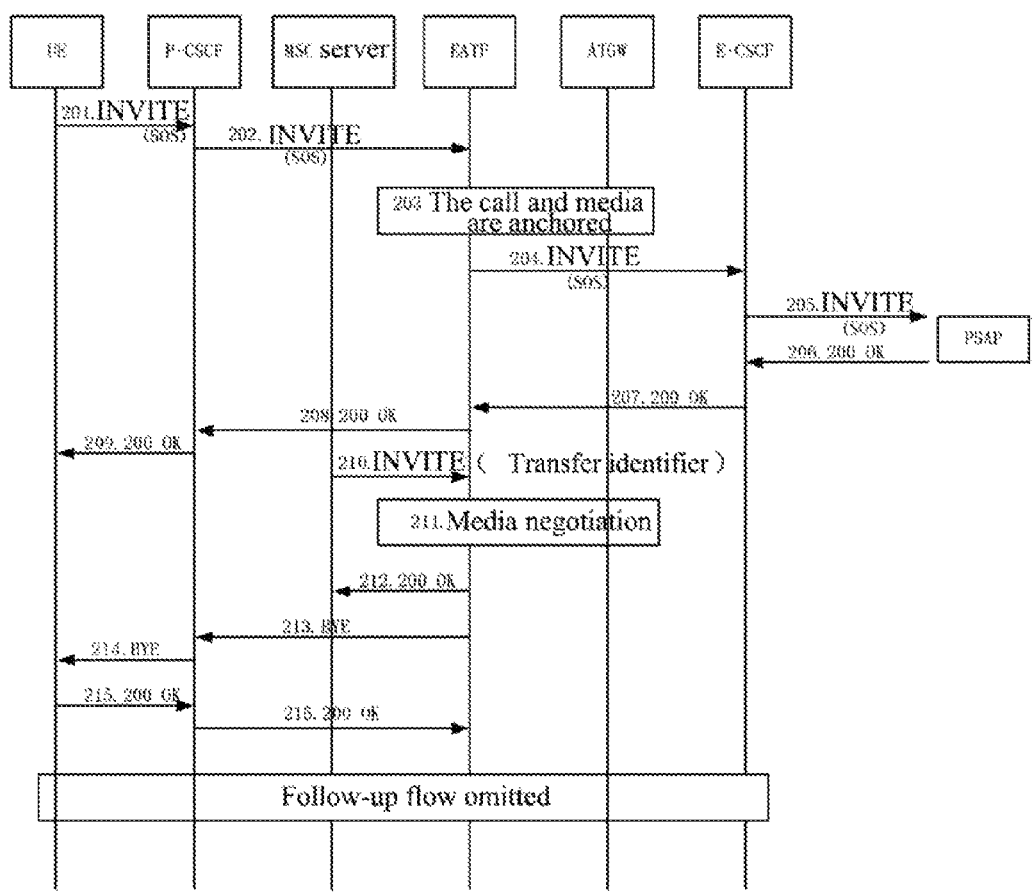
FIG. 2 is a flow diagram of signaling of the emergency call PS-CS transfer process according to a way of anchoring the media of the present document.

As shown in FIG. 2, it is a flow diagram of signaling of the emergency call PS-CS transfer process according to the way of anchoring the media of the present document, and the process includes the following steps.

In step 201, a user initiates an emergency call via the PS access.

In step 202, the P-CSCF routes the emergency call to the EATF entity.

In step 203-204, the EATF entity anchors the call and the media, and routes the call to the E-CSCF.

In step 205-209, the follow-up emergency call flow is completed according to the existing mechanism.

In step 210, the user moves to a CS access network, initiates an emergency call transfer invite to the IMS network via an eMSC Server, and routes the invite to the EATF entity.

In step 211, the EATF entity identifies that the received INVITE message invites to perform transfer of a certain existing emergency call, replaces a media which the original PS accesses with a media in the INVITE message which the CS accesses, and performs media negotiation with an Access Transfer Gateway (ATGW).

In step 212, response message is sent to the MSC Server, the acquired ATGW anchored media information is carried in the message. A media channel between the user (accessing via the CS) and a PSAP is established to implement a continued call.

In step 213-216, the EATF entity initiates to release an original PS access side session.

The follow-up flow is identical with the existing relevant specifications, which will not be described in detail here.

Figure 3:
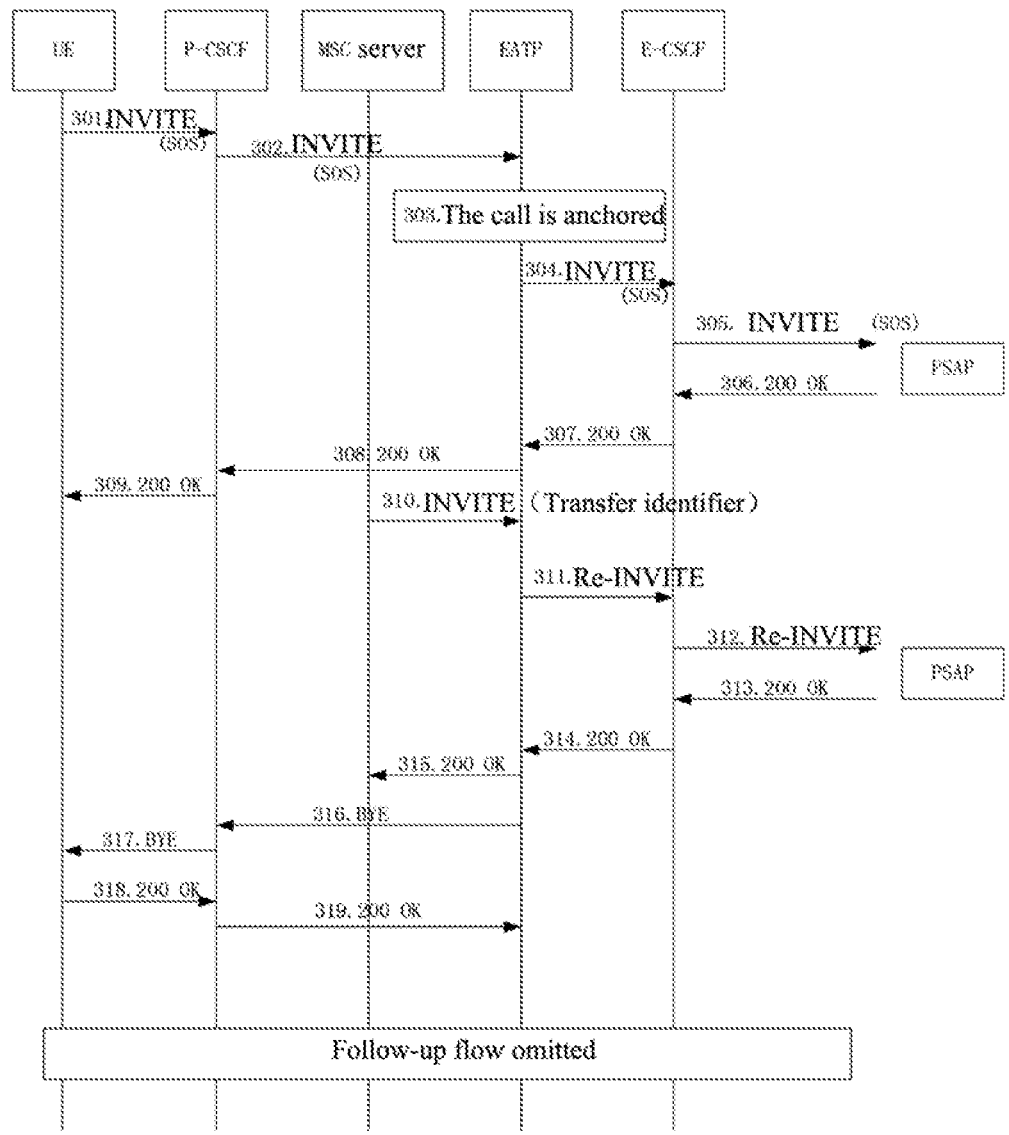
FIG. 3 is a flow diagram of signaling of the emergency call PS-CS transfer process according to a way of not anchoring the media of the present document.

As shown in FIG. 3, it is a flow diagram of signaling of the emergency call PS-CS transfer process according to the way of not anchoring the media of the present document, and the process includes the following steps.

In step 301, a user initiates an emergency call via the PS access.

In step 302, the P-CSCF routes the emergency call to the EATF entity.

In step 303-304, the EATF entity anchors the call (but does not anchor the media), and routes the call to the E-CSCF.

In step 305-309, the follow-up emergency call flow is completed according to the existing mechanism.

In step 310, the user moves to the CS, initiates an emergency call transfer invite to the IMS network via a MSC Server, and routes the invite to the EATF entity.

In step 311, the EATF entity identifies that the received INVITE message invites to perform transfer of a certain existing emergency call, and initiates a media negotiation flow to an existing session of the other side via the media in the INVITE message which the CS accesses.

In step 312-314, the media negotiation is implemented according to the existing mechanism.

In step 315, response message is sent to the MSC server, the acquired far-end media is carried in the message. A media channel between the user (accessing via the CS) and a PSAP is established to implement a continued call.

In step 316-319, the EATF entity initiates to release an original PS access side session.

The follow-up flow is identical with the existing relevant specifications, which will not be described in detail here.

It should be noted that the flow of the above example is a schematic flow, and specific message and a flow thereof follow the Session Initiation Protocol (SIP) specifications. The mechanism is also applicable to the user roaming from the CS to the PS to implement the emergency call CS-PS transfer.

In addition, an interaction between the E-CSCF and a Location Retrieval Function (LRF) implemented by using the related art is not reflected in the schematic flow.

The messages between all the network elements in the above example are mainly to clearly indicate the acquisition of the access network transfer information and the idea of the call transfer. In the specific implementation, it is not limited to these network elements and messages.

Specific limitations are not made with regard to abnormal conditions in all the flows, sequence of certain messages in the case of permission and specific implementation within the network elements.

With the method for switching the session of the IMS network, the transfer speed can be further accelerated, which improves the user experience and satisfaction.

Figure 4:
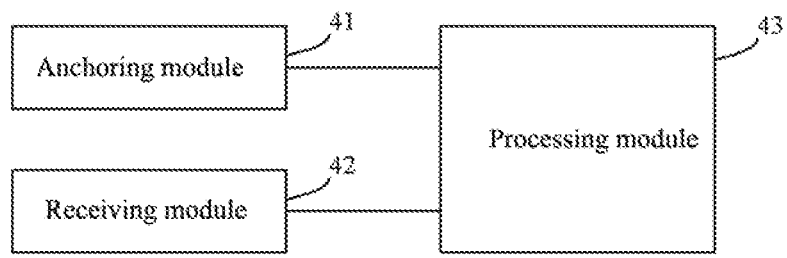
FIG. 4 is a schematic diagram of structure of an EATF entity according to the example of the present document.

As shown in FIG. 4, it is a schematic diagram of structure of an EATF entity according to the example of the present document, the EATF entity includes an anchoring module 41, a receiving module 42 and a processing module 43, wherein:

the anchoring module is configured to: anchor a call sent by a network element in a call initiation domain, and route the call to an Emergency-Call Session Control Function (E-CSCF);

the receiving module is configured to: receive call transfer invite message sent by a network element in a call termination domain; and the processing module is configured to: if identifying that the call transfer invite message is an invite message inviting to perform transfer of the call, perform media negotiation, and send response message carrying media information to the network element in the call termination domain.

Wherein, the processing module is configured to perform media negotiation and send the response message carrying media information to the network element in the call termination domain in the following way: if identifying that the call transfer invite message is the invite message inviting to perform transfer of the call, initiating the media negotiation to the call through a media carried in the call transfer invite message to obtain far-end media information, and sending a response message carrying the far-end media information to the network element in the call termination domain.

In addition, the anchoring module is further configured to anchor the media after anchoring the call sent by the network element in the call initiation domain. At this point, the processing module is configured to perform media negotiation and send the response message carrying media information to the network element in the call termination domain in the following way: if identifying that the call transfer invite message is the invite message inviting to perform transfer of the call, replacing a media which a call initiation domain accesses with a media carried in the call transfer invite message, performing media negotiation with an ATGW to obtain ATGW anchored media information, and sending the response message carrying the ATGW anchored media information to the network element in the call termination domain.

Preferably, the network element in the call initiation domain is a Proxy-Call Session Control Function (P-CSCF), and the network element in the call termination domain is a Mobile Switching Center (MSC) server; or, the network element in the call initiation domain is the MSC server, and the network element in the call termination domain is the P-CSCF.

In the implementation, the EATF entity and the P-CSCF can be configured in one or configured separately; and, the EATF entity and the E-CSCF can be configured in one or configured separately.

With the EATF entity, the transfer speed can be further accelerated, which improves the user experience and satisfaction.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present document is not limited to any combination of hardware and software in a specific form.

The above examples are only used to describe the technical scheme of the present document, which does not limit the technical scheme of the present document. The present document is just described in detail with reference to the preferred examples. The ordinary person skilled in the art should understand that, with regard to the technical scheme of the present document, modifications or equivalent substitutions can be made without departing from the spirit and scope of the technical scheme of the present document, and all these modifications and equivalent substitutions should be covered within the scope of the claims of the present document.

INDUSTRIAL APPLICABILITY

Compared with the related art, with the method and the EATF entity provided in the example of the present document, the engineering networking and routing configuration can be simple and convenient, and the transfer speed can be further accelerated, which improves the user experience.

What is claimed is:

1. A method for switching a session of an IP Multimedia Subsystem (IMS) network, comprising:
   receiving, by an Emergency Access Transfer Function (EATF) entity, an emergency call which is routed by a Proxy-Call Session Control Function (P-CSCF) in a call initiation domain;
   anchoring, by the EATF entity, the emergency call, and routing the emergency call to an Emergency-Call Session Control Function (E-CSCF);
   receiving, by the EATF entity, a call transfer invite message sent by a Mobile Switching Center (MSC) server in a call termination domain; and
   when identifying that the call transfer invite message is an invite message inviting to perform transfer of the emergency call, performing, by the EATF entity, media negotiation, and sending a response message carrying media information to the MSC server in the call termination domain.

2. The method according to claim 1, wherein,
   the step of performing, by the EATF entity, media negotiation and sending a response message carrying media information to the MSC server in the call termination domain comprises:
   initiating, by the EATF entity, the media negotiation to the emergency call through a media carried in the call transfer invite message to obtain far-end media information, and sending the response message carrying the far-end media information to the MSC server in the call termination domain.

3. The method according to claim 1, further comprising:
   anchoring, by the EATF entity, media by interacting with an Access Transfer Gateway (ATGW) after anchoring the emergency call.

4. The method according to claim 3, wherein, the step of performing, by the EATF entity, media negotiation and sending a response message carrying media information to the MSC server in the call termination domain comprises:
   replacing, by the EATF entity, a media which the call initiation domain accesses with a media carried in the call transfer invite message, performing the media negotiation with the ATGW to obtain ATGW anchored media information, and sending the response message carrying the ATGW anchored media information to the MSC server in the call termination domain.

5. An Emergency Access Transfer Function (EATF) entity, comprising:
   a receiving module, configured to: receive an emergency call which is routed by a Proxy-Call Session Control Function (P-CSCF) in a call initiation domain;
   an anchoring module, configured to: anchor the emergency call, and route the emergency call to an Emergency-Call Session Control Function (E-CSCF);
   the receiving module, further configured to: receive a call transfer invite message sent by a Mobile Switching Center (MSC) server in a call termination domain; and
   a processing module, configured to: if identifying that the call transfer invite message is invite message inviting to perform transfer of the emergency call, perform media negotiation, and send a response message carrying media information to the MSC server in the call termination domain.

6. The EATF entity according to claim 5, wherein,
   the processing module is configured to perform media negotiation and send the response message carrying the media information to the MSC server in the call termination domain in the following way:
   initiating, by the EATF entity, the media negotiation to the emergency call through a media carried in the call transfer invite message to obtain far-end media information, and sending the response message carrying the far-end media information to the MSC server in the call termination domain.

7. The EATF entity according to claim 5, wherein,
   the anchoring module is further configured to: anchor media by interacting with an Access Transfer Gateway (ATGW) after anchoring the emergency call.

8. The EATF entity according to claim 7, wherein,
   the processing module is configured to perform media negotiation and send the response message carrying media information to the MSC server in the call termination domain in the following way:
   replacing, by the EATF entity, a media which the call initiation domain accesses with a media carried in the call transfer invite message, performing the media negotiation with the ATGW to obtain ATGW anchored media information, and sending the response message carrying the ATGW anchored media information to the MSC server in the call termination domain.

9. The EATF entity according to claim 5, wherein,
   the EATF entity and the P-CSCF are configured in one or configured separately; or
   the EATF entity and the E-CSCF are configured in one or configured separately.

* * * * *